United States Patent Office 3,488,669
Patented Jan. 6, 1970

3,488,669
TUBULAR FILM DIE
Richard W. Goodrum and Charles A. Cook, Baton Rouge, La., Richard L. Swenson, Somerville, N.J., and Garland E. Raley, Terre Haute, Ind., assignors to Ethyl Corporation, New York, N.Y., a corporation of Virginia
Filed Feb. 1, 1968, Ser. No. 702,227
Int. Cl. B29d 23/04
U.S. Cl. 18—14                                 5 Claims

ABSTRACT OF THE DISCLOSURE

A die assembly for extruding tubular plastic material to produce lay-flat plastic tubing. The assembly includes a die holder or a base section having a spider section mounted thereon. The spider section provides a plurality of longitudinally extending passages therethrough and has a cone shaped mandrel portion extending into the die holder, to provide a conical flow passage for the thermoplastic material. A cup section is mounted atop the spider section and provides a generally conical cavity which receives a mandrel section that is removably bolted onto the top of the spider section. An annular cup lip section surrounds the upper portion of the mandrel to provide the annular extrusion orifice for extrusion of the tubular thermoplastic material. The die is characterized by its ruggedness and is held together by bolts whereby the die may be quickly disassembled for cleaning then reassembled. The die presents a smooth interior surface with no sharp turns for the flowing thermoplastic which makes the die eminently suitable for use in extruding heat sensitive thermoplastic material such as polyvinyl chloride since there are no places where thermoplastic may stagnate or hang up. Extremely high torque is used on the bolts to assemble the die to prevent ingress of thermoplastic material in between the abutting mating surfaces of the die sections.

BACKGROUND OF THE INVENTION

Field of the invention

This invention relates to a die assembly for extrusion of thermoplastic material to produce lay-flat plastic tubing.

Description of the prior art

Bottom fed dies for extruding lay-flat plastic tubing are commonly used to produce thin wall polyethylene tubing which may be later converted to polyethylene film. Certain of these dies have been made by assembling one or more components in a vertically arranged stack to produce a bottom fed die assembly. An exemplary die of this type is shown in U.S. Patent 2,937,402 which die is made by bolting together a number of individual components into a unitary assembly. In the dies used for manufacturing thin, lay-flat polyethylene tubing it is not particularly critical that the flow passages be extremely smooth and free from areas wherein stagnation in the plastic melt may occur. Further, it is not essential that mating surfaces between the individual components of the die assembly be tightly coupled to prevent migration of molten thermoplastic material in between these mating surfaces since polyethylene is not particularly heat sensitive and thus does not char or decompose too readily under normal extrusion conditions. However, in the manufacture of polyvinyl chloride film the art has been faced with a difficult problem caused by the high heat sensitivity of polyvinyl chloride. When retained in a die for even a short period of time polyvinyl chloride can degrade and carbonize. This produces discoloration of the melt and produces catalytic degradation of the polyvinyl material flowing through the die passages.

Thus there is a recognized need in the art for a die assembly which provides a minimum of areas wherein the polyvinyl chloride can stagnate and decompose. Additionally, there is a need to provide a stacked die which can be assembled under extremely high pressures and which has very closely machined and ground mating surfaces between the abutting sections to prevent intrusion of any molten plastic material into the areas between the mating surfaces thereby to prevent thermal decomposition and subsequent fouling of the thermoplastic material flowing through the die.

SUMMARY OF THE INVENTION

It is an object of the present invention to provide a die assembly for extruding heat sensitive thermoplastic material.

It is a further object of the present invention to provide a die assembly which can be quickly assembled and disassembled from a plurality of close fitting components.

It is also an object of the present invention to provide a die assembly which can be coupled together with extremely high torque to prevent intrusion of thermoplastic between the components of the die assembly.

It is a still further object of the present invention to provide a die assembly which is rugged in construction and which is not distorted by the high pressure of the thermoplastic material flowing therethrough.

The foregoing objects and other advantages brought out hereinafter are realized in a die assembly for extruding tubular lay-flat thermoplastic tubing which assembly includes a die holder section providing an axial, upwardly diverging, conical passage therethrough. A separate spider section is coupled to the top of the die holder section. The spider section has a conical projection on its bottom end which is received in the conical opening provided in the die holder section. A separate die cup section is coupled to the top of the spider section and provides an axial, upwardly diverging, conical opening therethrough. A separate mandrel section is coupled to the top of the spider section and is received in the conical opening in the die cup section. The mandrel has a central conical wall portion spaced from the conical wall portion of the cup section of the die assembly. A separate adjustable annular cup lip section is coupled to the top of the cup section and has an inner cylindrical wall surface spaced from the upper outer cylindrical wall surface of the mandrel to define the annular orifice for the extrusion of the lay-flat plastic tubing. Means are provided for coupling the die holder, spider, die cup, mandrel, and cup lip sections into a unitary assembly whereby the thermoplastic material flowing through the die cannot penetrate in between the contacting surfaces of the assembly.

The die assembly of the present invention is characterized by an extremely smooth interior surface exposed to the flowing thermoplastic material whereby no pockets of stagnation or hang up occur. This is essential in extruding heat sensitive thermoplastic matreials such as polyvinyl chloride. The die of the present invention provides advantages over heretofore known stacked die assemblies in that the mating surfaces of the several components are carefully machined, ground and precision fitted and coupled together under a high torque force, e.g., 3,000 to 12,000 foot pounds of torque in order to prevent migration of any thermoplastic material into the interface area between the abutting surfaces of the individual components of the die assembly.

DESCRIPTION OF THE PREFERRED EMBODIMENTS

Figure 1:
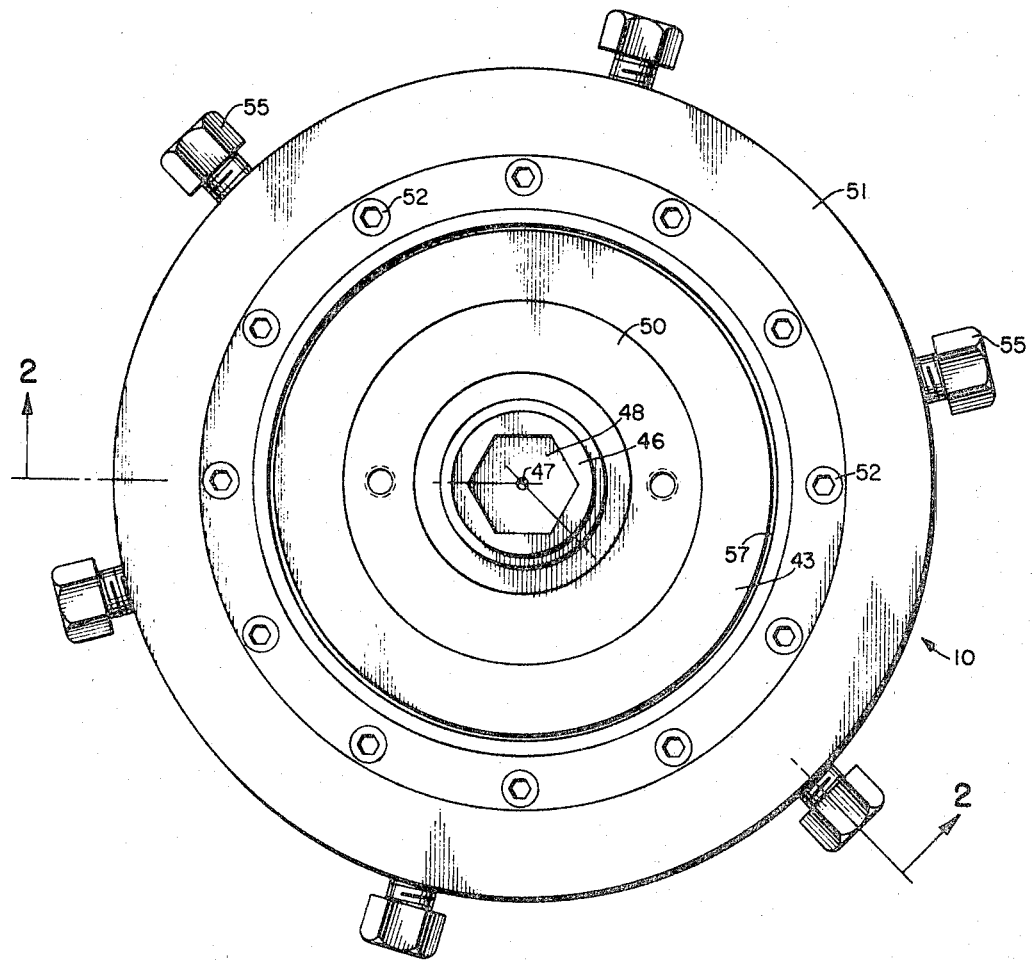
FIGURE 1 is a plan view of a tubular film die assembly constructed in accordance with the present invention.
Figure 2:
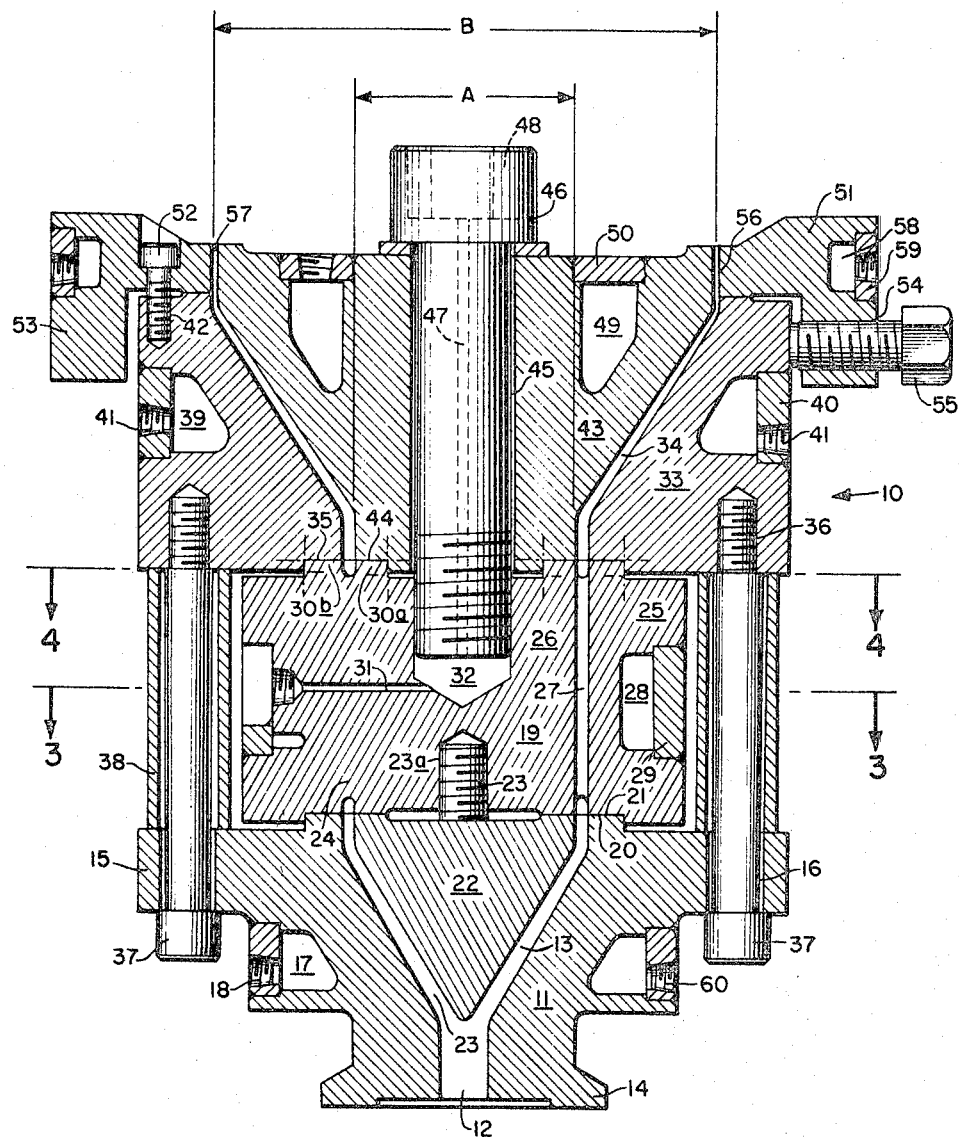
FIGURE 2 is an axial sectional view of the die of FIGURE 1 taken along the line 2—2.

Referring now to FIGURES 1 and 2 the die assembly of the present invention, designated generally by the numeral 10, as seen in FIGURE 2 inludes a die holder or base section 11 at the bottom thereof. The die holder section is provided with a generally cylindrical axial passage 12 which merges into an upwardly diverging conical cavity 13 that opens in the upper face of the die holder. The base of the die holder section is provided with a shoulder 14 which is adapted to be mounted on the elbow of a plastic extruder (not shown) and to be coupled thereto by a quick connect clamp. A generally cylindrical flange 15 extends out from the upper portion of the die holder section 11 and provides a plurality of evenly spaced openings 16 adjacent the outer edge thereof. The flange 15 may be attached to the die holder section 11 by means of welding or it may be integrally formed with the die holder section. An annular recess 17 is provided in the outer wall of the die holder section 11 and is covered by a cylindrical band 18 attached to the outer wall by welding or other suitable means. Threaded openings 60 are provided on opposite sides of the band 18 to permit steam or other heating fluid to be circulated through the annular recess 17 to heat the die holder section.

A generally cylindrical spider section 19 is mounted on top of the die holder section 11. The die holder section 11 is provided with an annular raised shoulder 20 on the top surface thereof. This shoulder is received in a generally cylindrical recess 21 provided in the bottom face of spider section 19. The mating surfaces on the top of the shoulder 20 and the bottom of the recess 21 are machined and ground to an extremely smooth surface and a highly accurate fit is attained in these abutting surfaces to prevent molten plastic material from penetrating between these surfaces. The vertical walls of the shoulder 20 and the recess 21 must be machined and ground with very close tolerance to provide a perfect fit so that there will be no misalignment between the joining interior walls of the die holder section 11 and the spider section 19.

Figure 3:
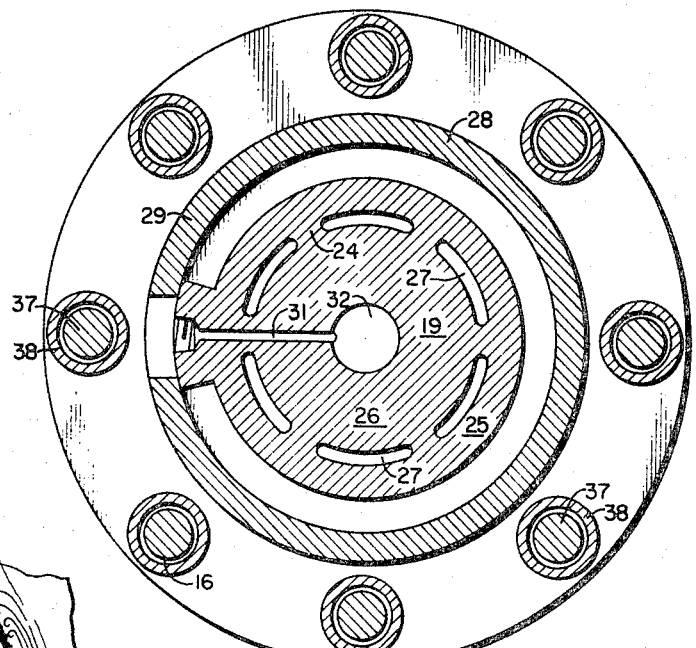
FIGURE 3 is a cross sectional view of the die of FIGURE 2 taken along the line 3—3.
Figure 4:
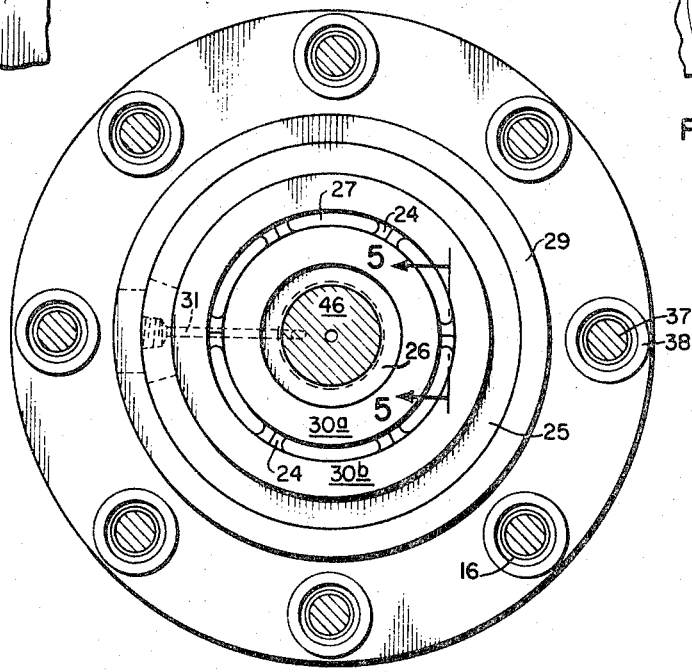
FIGURE 4 is a cross sectional view of the die of FIGURE 2 taken along the line 4—4.

The spider section 19 has extending from the bottom surface thereof a conical extension 22. The extension 22 is attached to the spider section by means of a threaded boss 23 received in axially aligned threaded opening 23a provided in the bottom of the spider section 19. The conical extension 22 extends into the conical opening 13 provided in the die holder section 11. The outer wall of the conical extension 22 together with the interior wall of the die holder 11 define a generally conically shaped annular space 23 through which the thermoplastic material entering the opening 12 flows up into the spider section 19 of the die. As can be seen more clearly in FIGURES 3, 4, and 5 a plurality of spiders or spokes 24 connects the generally cylindrical outer wall portion 25 of the spider section 11 with the inner cylindrical portion 26. A plurality of evenly spaced, arcuately shaped, longitudinal passages 27 are provided in the spider section 19 between the outer wall portion 25 and the inner cylindrical portion 26. These openings 27 provide passages for the thermoplastic material flowing from the conical shaped space 23 in the die holder section 11 up through the spider section 19. The outer wall portion 25 of the spider 19 is provided with a generally rectangular shaped annular recess 28 which is covered by a cylindrical band 29 that is welded to the wall portion to provide maximum strength. Steam, hot oil, or other heat transfer media is circulated through recess 28.

The top surface of the spider section 19 is provided with a raised shoulder having an inner portion 30a and an outer portion 30b separated by an annular opening having the same width as the opening 27 which defines the spiders 24 in the spider section 19. A small radial passage 31 having a threaded outer portion extends from the outer wall of the spider section 19 to communicate with an axially aligned bore 32 provided in the top of spider section 19.

A separate die cup section 33 is mounted on top of the spider section 19. The die cup section 33 has a large axial passage 34 therethrough which defines the interior wall of the die cup section. The lower portion of the passage 34 is generally cylindrical in shape, the intermediate portion is conically shaped with the walls diverging in the upward direction and terminating in a section having a generally cylindrical wall at the top of the die cup section. An annular recess 35 is provided in the bottom surface of the die cup 33. This recess receives and fits tightly down over the outer annular shoulder portion 30b provided on the top of the spider 19. A precision fit between these surfaces is necessary to provide a seal against penetration of thermoplastic material in between these mating surfaces.

A plurality of threaded bores 36 are provided in the bottom surface of the die cup section 33 adjacent its outer edge. A plurality of bolts 37 extend through the openings 16 provided in the flange 15 and have their threaded ends received in the threaded bores 36 in the die cup section. A generally cylindrical spacer sleeve 38 surrounds each bolt 37 and extends from the upper surface of flange 15 to the bottom surface of the die cup section 33. The sleeves are adjusted in length to provide a precision fit between the mating surfaces of the annular shoulder 20 and cylindrical recess 21 and the mating surfaces of the outer portion of the shoulder 30b and the annular recess 35. When bolts 37 are torqued with the proper force the mating surfaces between the aforementioned shoulders and recesses are brought together with sufficient force so that the molten thermoplastic material cannot penetrate the interfacial area between these mating surfaces.

An annular recess 39 is provided in the outer wall of the die cup section 33 and is covered by cylindrical sleeve 40 which forms a part of the outer wall section of the die cup to provide an annular space for circulation of a heating media for the die cup section 33. Opposite threaded openings 41—41 are provided in the sleeve for an inlet and outlet for the heating media.

A separate mandrel section 43 of the die assembly is received in the opening 34 provided in the die cup section 33. The mandrel section 43 provides a recessed annular shoulder 44 on its bottom surface which seats against and mates with the outer portion 30b of the shoulder on top of the spider 19. The mandrel provides an axial cylindrical opening 45 therethrough which receives a large socket head bolt 46. The threaded lower end of bolt 46 engages threads provided in the axial bore 32 in the top of the spider section 19. A small axial passage 47 extends through the bolt 46 and communicates with the radial opening 31 in the spider section by means of the axial counterbore space 32 provided at the bottom of the bolt. By means of radial opening 31 and passageway 47 air can be supplied to inflate the thermoplastic bubble produced by the die assembly 10 of the present invention. Bolt 46 is shown as having a socket head opening 48 recessed at the top. It is understood that other types of bolts can be used if desired.

An annular recess 49 is provided in the top surface of the mandrel 43 and is sealed by means of cover ring 50 to provide a closed space for circulation of a heating medium therethrough. The mandrel 43 has a shape which coincides substantially to that of the opening 34 provided in the die cup section. The lower portion of the mandrel outer wall surface is generally cylindrical and the intermediate central portion thereof is conical and outwardly diverging while the upper portion thereof is generally cylindrical in shape. It should be noted that the annular space remaining when the mandrel 43 is inserted in the opening 34 in the die cup provides a gradually decreasing opening from the bottom of the assembly to the top thereof. This may be accomplished by either converging the wall of the die cup 33 toward the wall of the mandrel 43 or by converging the wall of the mandrel section 43 towards the die cup 33 or converging both walls.

An annular cup lip section 51 is seated on the top surface of the die cup section 33 and held in position by series of socket head bolts 52 which have their threaded ends received in the threaded bore 42 provided in the top of the die cup section 33. The cup lip section 51 is provided with a depending annular skirt section 53 surrounding the upper portion of the die cup section 33. The skirt 53 is provided with a plurality of transversely threaded openings 54 evenly spaced around the skirt which receive a threaded bolt 55. The inner end of bolt 55 bears against the outer surface of the top section of the die cup 33. Bolts 55 are provided to position and to precisely adjust the spacing of the inner cylindrical wall 56 of the cup lip section from the opposite cylindrical wall of the mandrel 43 to provide accurate control of the spacing of the orifice opening 57 through which the thermoplastic material is extruded. A generally annular recess 58 is provided in the upper outer wall of the cup lip section 51. The recess is sealed by annular band 59 to provide a sealed space for circulation of the heating media to heat the cup lip section.

In one exemplary construction of the die of the present invention made for extruding lay-flat thermoplastic tubing from polyvinyl chloride resin the die was sized to provide an extruded polyvinyl chloride tube diameter of eight inches at the die orifice. The die holder section 11 was fabricated to stand $4^{11}/_{32}$ inches in height. The spider section 19 had an outside wall height of $3^{15}/_{16}$ inches. The die cup section 33 and cup lip section 52 had a combined height of $5^{1}/_{32}$ inches as measured from the bottom of the die cup section to the level of the cup lip section at the orifice opening 57. A space of $1/_{16}$ inch separates the facing shoulders provided by the outer portion of the spider section and both the opposed face of the die holder section 11 and the die cup section 33. When assembled the die had a height of $13^{7}/_{16}$ inches measured from the bottom face of the die holder section 11 to the flat surface at the level of the orifice 57. The die was constructed of 420 stainless steel which is resistant to the degradation products of polyvinyl chloride. The die can also be made of tool steel and chrome plated to resist corrosion.

In manufacturing the die components it is essential that the shoulder 20 be machined to have an extremely close and tight fit with the mating surface provided by the recess 21 in the spider 19. It is also essential that similar mating surfaces at the top of the spider, i.e., the shoulder portion 30b be machined to fit very tightly and very snugly with the annular recess 35 provided in the bottom of the die cup assembly. Also the shoulder portion 30a should be machined to fit precisely with the annular recess 44 in the bottom of the mandrel section in order to provide an extremely tight fit of the mating surfaces of the die components to prevent any molten polyvinyl chloride from seeping into the interfacial area between these die components. Additionally the conical extension 22 of the spider should be tightly screwed onto the bottom of the spider to make sure that no plastic material penetrates between these mating surfaces.

Figure 6:
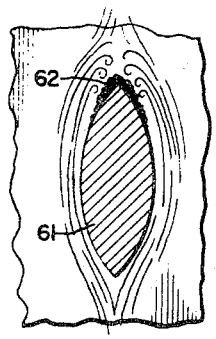
FIGURE 6 is a vertical sectional view through a spider or spoke section of a prior art die assembly.
Figure 5:
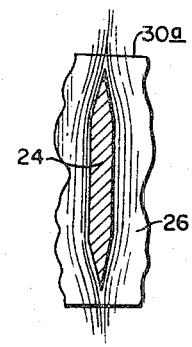
FIGURE 5 is a vertical sectional view through a spider or spoke portion of the die depicted in FIGURE 4 taken along the line 5—5.

In the die of the present invention it is very important that the thickness of the spider or spoke sections 24 be kept to a minimum. The spiders should not be any wider than required to provide the strength necessary to prevent the spiders from breaking under the pressure of the molten plastic flowing up through the die assembly. As seen in FIGURE 5 the spoke 24 is very narrow and long with a low angle tapered portion at each end thereof. This construction permits the thermoplastic material to achieve streamline flow over the spider and does not cause any turbulence to be created in the plastic as it flows across the spider. As seen in FIGURE 6 the prior art spoke or spider 61 is generally elliptical in shape and has a width much greater than does the spider 24 used in the dies of the present invention. As the plastic material flows over this type spider it produces an area of turbulence at the top of the spider where stagnation can occur. This causes burning and degradation of heat sensitive materials like polyvinyl chloride and produces a carbon mass 62 at the top of the spider. Since many die assemblies used for polyethylene extrusion have generally elliptical spiders these dies have not been found suitable for extrusion of polyvinyl chloride. The thin, long spider sections 24 of the present die assembly also minimize production of so-called "gauge bands" in the film which are often produced by spiders of conventional dies such as shown in FIGURE 6. The present thin spider section 24 does not restrict the flow of plastic through the die lips to the extent that the thicker conventional spiders 61 do and thus relatively little thinning of the wall of the tubular film occurs immediately above each of the spiders 24.

In assembling the die the spacers 38 should be carefully sized as stated hereinbefore to provide a tight fit between the mating surfaces of the three outer components of the die to prevent migration of thermoplastic material between the mating surfaces. If the sleeves 38 are made too short and too much torque is applied to the bolts 37 it will cause the mating surfaces between the die holder section 11, spider 19, and die cup 33 to spring open slightly and permit thermoplastic material to enter the area between the mating surfaces where it will degrade and cause charring of the polyvinyl chloride which will further degrade the thermoplastic material passing through the die channels. If the sleeves 38 are too long, insufficient force will be applied to the mating surfaces between the foregoing components and this will also permit thermoplastic material to enter between these mating surfaces resulting in charring and degradation of the thermoplastic material flowing to the die lips. It is essential also that the large bolt 46 holding the mandrel section 43 to the die section 19 be screwed into the die spider section 19 with sufficient force to prevent plastic from creeping into the mating surfaces 30a and 44. The bolt 46 must also be tightened with a sufficient force so that mandrel section 43 has sufficient rigidity to resist the upward thrust produced by the viscous thermoplastic material flowing up out of the spider section and pressing against the diverging conical wall surfaces of the mandrel 43. It has been found that it is necessary to torque the bolt 46 with a force which varies between 2,000 foot pounds torque and 12,000 foot pounds torque depending upon the size of the die in use. For a 3½ inch extruder feeding polyvinyl chloride compound to a die having an orifice diameter of 8 inches it was found that the torque that should be applied to the bolt 46 ranges from about 2,400 foot pounds to about 3,000 foot pounds. When using the exemplary die described in the foregoing section (i.e., one 8 inch diameter) it was found that the torque applied to bolt 46 should be from about 2,400 to about 3,000 foot pounds of torque.

In order to resist the high forces encountered in extruding polyvinyl chloride it has been found that there should be a certain ratio maintained between the diameter "A" of the cylindrical portion of the body at the bottom of the mandrel section 43 and the diameter "B" of the vertical upper wall section of the mandrel section 43. This ratio, representing the projected area across the mandrel section 43, must be consistent with the available retaining force of bolt 46. That is, as the annular opening of the die increases this ratio must decrease to maintain a bolt size with practical torquing limits. The die of the present invention will effectively resist the upward thrusting forces of the thermoplastic material if the ratio for these two diameters ranges from about 1.5/1 to about 2.0/1 with a 1½ inch diameter cap screw. If the ratio is kept in this range and the 1½ inch cap screw is torqued in the range of 2,400 to 2,800 foot pounds it will provide sufficient rigidity to the mandrel 43 to resist distortion by the lifting action of the thermoplastic material flowing through opening 34. Pressures as high as 7,000 p.s.i. have been used satisfactorily in the 8 inch die.

While there has been described what is at present considered to be the preferred embodiments of the present invention, it will be apparent to those skilled in the art that various modifications and changes may be made without departing from the essence of the invention. Thus it is intended to cover herein all such modifications and changes that come within the true scope of the claims.

What is claimed is:

1. In an annular die for extrusion of thermoplastic material for the production of lay-flat plastic tubing the combination comprising:
    (a) a die holder section providing an axial, upwardly diverging, conical passage therethrough;
    (b) a separate spider section coupled to the top of said die holder section, said spider section having a conical projection on the bottom thereof received in said conical opening provided in said die holder section and a plurality of longitudinal passages communicating with the passage in said die holder section;
    (c) a separate die cup section coupled to the top of said spider section, said cup section providing an axially aligned, upwardly diverging, conical passage therethrough communicating with said longitudinal passages in said spider section;
    (d) a separate mandrel section coupled to the top of said spider section and received in said conical passage in said die cup section, said mandrel having a central conical wall portion spaced from the conical wall of said section;
    (e) a separate adjustable annular cup lip section coupled to the top of said cup section and having its inner wall surface spaced from the upper outer wall surface of said mandrel to define the annular orifice for the extrusion of said lay-flat plastic tubing; and
    (f) means coupling said die holder, spider, die cup, mandrel, and cup lip sections into a unitary assembly whereby the thermoplastic material flowing through said die cannot penetrate in between the contacting surfaces of said assembly.

2. The die of claim 1 wherein said means coupling said die holder, spider, die cup, mandrel, and cup lip section into a unitary assembly includes a bolt.

3. The die of claim 1 wherein a portion of the interior of said cup section and a portion of the exterior wall of said mandrel section define a generally conical, upwardly converging passageway for the flow of thermoplastic material to said annular orifice.

4. The die of claim 1 wherein said means coupling said mandrel to said spider section comprises a single, axially aligned bolt having one end thereof threadedly received in said spider section, said bolt being tightened with a torque force from about 2,000 to about 12,000 foot pounds.

5. The die of claim 4 having the capability to resist significant deformation at thermoplastic material pressures up to 7,000 p.s.i.

References Cited

UNITED STATES PATENTS

| | | |
|---|---|---|
| 1,914,689 | 6/1933 | Humphrey. |
| 2,859,476 | 11/1958 | Lamson. |
| 2,978,748 | 4/1961 | McCauley et al. |
| 3,018,516 | 1/1962 | Clinefelter. |
| 3,193,878 | 7/1965 | Corbett. |
| 3,321,805 | 5/1967 | Given. |

WILLIAM J. STEPHENSON, Primary Examiner

PO-1050
(5/69)

UNITED STATES PATENT OFFICE
CERTIFICATE OF CORRECTION

Patent No. 3,488,669      Dated January 6, 1970

Inventor(s) Richard W. Goodrum et al

It is certified that error appears in the above-identified patent and that said Letters Patent are hereby corrected as shown below:

Column 2, line 57, reads "matreials", should read -- materials -- . Column 3, line 14, reads "inludes", should read -- includes -- . Column 5, line 19, reads "transversely should read -- transverse -- . Column 7, line 38, reads "sai section", should read -- said cup section -- . Column 8, line 14, reads "the interior", should read -- the interior wall -- ; line 23 reads "force from", should read -- force of from -- .

SIGNED AND
SEALED
JUN 16 1970

(SEAL)
Attest:

Edward M. Fletcher, Jr.
Attesting Officer

WILLIAM E. SCHUYLER, JR
Commissioner of Patents